(12) United States Patent
Kim et al.

(10) Patent No.: US 11,423,142 B2
(45) Date of Patent: Aug. 23, 2022

(54) CONFIDENTIAL MACHINE LEARNING WITH PROGRAM COMPARTMENTALIZATION

(71) Applicant: NEC Laboratories America, Inc., Princeton, NJ (US)

(72) Inventors: Chung Hwan Kim, Pennington, NJ (US); Junghwan Rhee, Princeton, NJ (US); Kangkook Jee, Princeton, NJ (US); Zhichun Li, Princeton, NJ (US)

(73) Assignee: NEC Corporation

( * ) Notice: Subject to any disclaimer, the term of this patent is extended or adjusted under 35 U.S.C. 154(b) by 361 days.

(21) Appl. No.: 16/693,710

(22) Filed: Nov. 25, 2019

(65) Prior Publication Data

US 2020/0184070 A1    Jun. 11, 2020

Related U.S. Application Data

(60) Provisional application No. 62/775,986, filed on Dec. 6, 2018.

(51) Int. Cl.
*G06F 21/54* (2013.01)
*G06N 20/00* (2019.01)
(Continued)

(52) U.S. Cl.
CPC .............. *G06F 21/54* (2013.01); *G06F 8/425* (2013.01); *G06F 8/44* (2013.01); *G06F 8/73* (2013.01); *G06F 8/75* (2013.01); *G06F 21/53* (2013.01); *G06N 20/00* (2019.01); *G06F 2221/033* (2013.01)

(58) Field of Classification Search
CPC ....................................................... G06F 21/54
See application file for complete search history.

(56) References Cited

U.S. PATENT DOCUMENTS 11,200,144 B1 *  12/2021  Cook ................... G06F 11/3616
2018/0293057 A1 *  10/2018  Sun ......................... G06N 3/105
(Continued)

FOREIGN PATENT DOCUMENTS

WO    WO-2018106618 A2 *  6/2018  ........... G06F 21/629

OTHER PUBLICATIONS

Tsai, "Graphene-SGX: A Practical Library OS for Unmodified Applications of SGX", USENIX ATC, Jul. 2017, pp. 645-658.
(Continued)

*Primary Examiner* — Simon P Kanaan
(74) *Attorney, Agent, or Firm* — Joseph Kolodka (57) ABSTRACT

A method for implementing confidential machine learning with program compartmentalization includes implementing a development stage to design an ML program, including annotating source code of the ML program to generate an ML program annotation, performing program analysis based on the development stage, including compiling the source code of the ML program based on the ML program annotation, inserting binary code based on the program analysis, including inserting run-time code into a confidential part of the ML program and a non-confidential part of the ML program, and generating an ML model by executing the ML program with the inserted binary code to protect the confidentiality of the ML model and the ML program from attack.

20 Claims, 4 Drawing Sheets

(51) Int. Cl.
 *G06F 8/73*  (2018.01)
 *G06F 8/41*  (2018.01)
 *G06F 21/53* (2013.01)
 *G06F 8/75*  (2018.01)

(56) References Cited

U.S. PATENT DOCUMENTS

2019/0005410 A1\* 1/2019 Shekhar ................ G06N 20/00
2019/0303109 A1\* 10/2019 Fu ......................... G06N 20/00

OTHER PUBLICATIONS

Baumann, "Shielding Applications from an Untrusted Cloud with Haven", USENIX Symposium on Operating Systems Design and Implementation, Oct. 2014, 19 pages.

\* cited by examiner

CONFIDENTIAL MACHINE LEARNING WITH PROGRAM COMPARTMENTALIZATION

RELATED APPLICATION INFORMATION

This application claims priority to provisional application Ser. No. 62/775,986, filed on Dec. 6, 2018, incorporated by reference herein in its entirety.

BACKGROUND

Technical Field

The present invention relates to machine learning and artificial intelligence, and more particularly to confidential machine learning with program compartmentalization.

Description of the Related Art

Examples of artificial intelligence (AI)-powered services include, but are not limited to, object recognition, natural language generation, speech recognition, autonomous vehicle driving and robotic process automation. Such services can be made by possible by machine learning (ML) programs generating ML models, which can be expensive and time-consuming to generate. Despite the importance of protecting such information, ML models can be deployed in either a plain source or binary code format which can allow malicious users or attackers to steal deployed ML models or even reverse-engineer the ML programs used to generate the ML models.

SUMMARY

According to an aspect of the present invention, a method for implementing confidential machine learning with program compartmentalization is provided. The method includes implementing a development stage to design an ML program, including annotating source code of the ML program to generate an ML program annotation, performing program analysis based on the development stage, including compiling the source code of the ML program based on the ML program annotation, inserting binary code based on the program analysis, including inserting run-time code into a confidential part of the ML program and a non-confidential part of the ML program, and generating an ML model by executing the ML program with the inserted binary code to protect the confidentiality of the ML model and the ML program from attack.

In accordance with another embodiment of the present invention, a system for implementing confidential machine learning with program compartmentalization is provided. The system includes a memory device having program code stored thereon and at least one processor device operatively coupled to the memory device. The at least one processor device is configured to execute program code stored on the memory device to implement a development stage to design an ML program by annotating source code of the ML program to generate an ML program annotation, perform program analysis based on the development stage by compiling the source code of the ML program based on the ML program annotation, insert binary code based on the program analysis by inserting run-time code into a confidential part of the ML program and a non-confidential part of the ML program, and generate an ML model by executing the ML program with the inserted binary code to protect the confidentiality of the ML model and the ML program from attack.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The embodiments described herein can be used to provide confidential computing to machine learning (ML) programs and/or ML models. Using a naïve confidentiality approach that loads the entire code and data of the ML model into a private memory region, expensive swapping between the memory and disk can occur, resulting in potentially significant swapping overhead to ML model execution that can limit the utility of the ML model.

One example of such a private memory region is an enclave. An enclave refers to a private execution memory region having contents that are protected and unable to be either read or saved by any process outside of the enclave itself, including processes running at higher privilege levels. An enclave can be defined by a set of security-related instruction codes (e.g., opcodes), which can allow user-level and/or operating system code to define the enclave. The set of security-related instruction codes can be built into a central processing unit (CPU). One example of a set of security-related instruction codes is Intel® Software Guard Extensions (Intel® SGX).

The embodiments described herein can increase the speed of execution of ML models with confidentiality protection by reducing the swapping overhead. More specifically, the embodiments described herein provide for a high-efficiency confidential execution engine that encapsulates only the minimal ML code and data in a private memory region, such as an enclave, to keep the size of the private memory region small while providing the same level of confidentiality protection. Thus, the protected ML model can perform more efficiently with a smaller private memory region size, without the expensive swapping overhead.

For example, the embodiments described herein can automatically identify sensitive or confidential portions of the ML program (which attackers may steal or reverse engineer) and, during compilation, the ML program is compartmentalized into a confidential part and a non-confidential part. Only the confidential part is loaded into the enclave isolated from the non-confidential part. The confidential and non-confidential parts can then interact through a secure communication channel during execution of the ML model.

Figure 1:
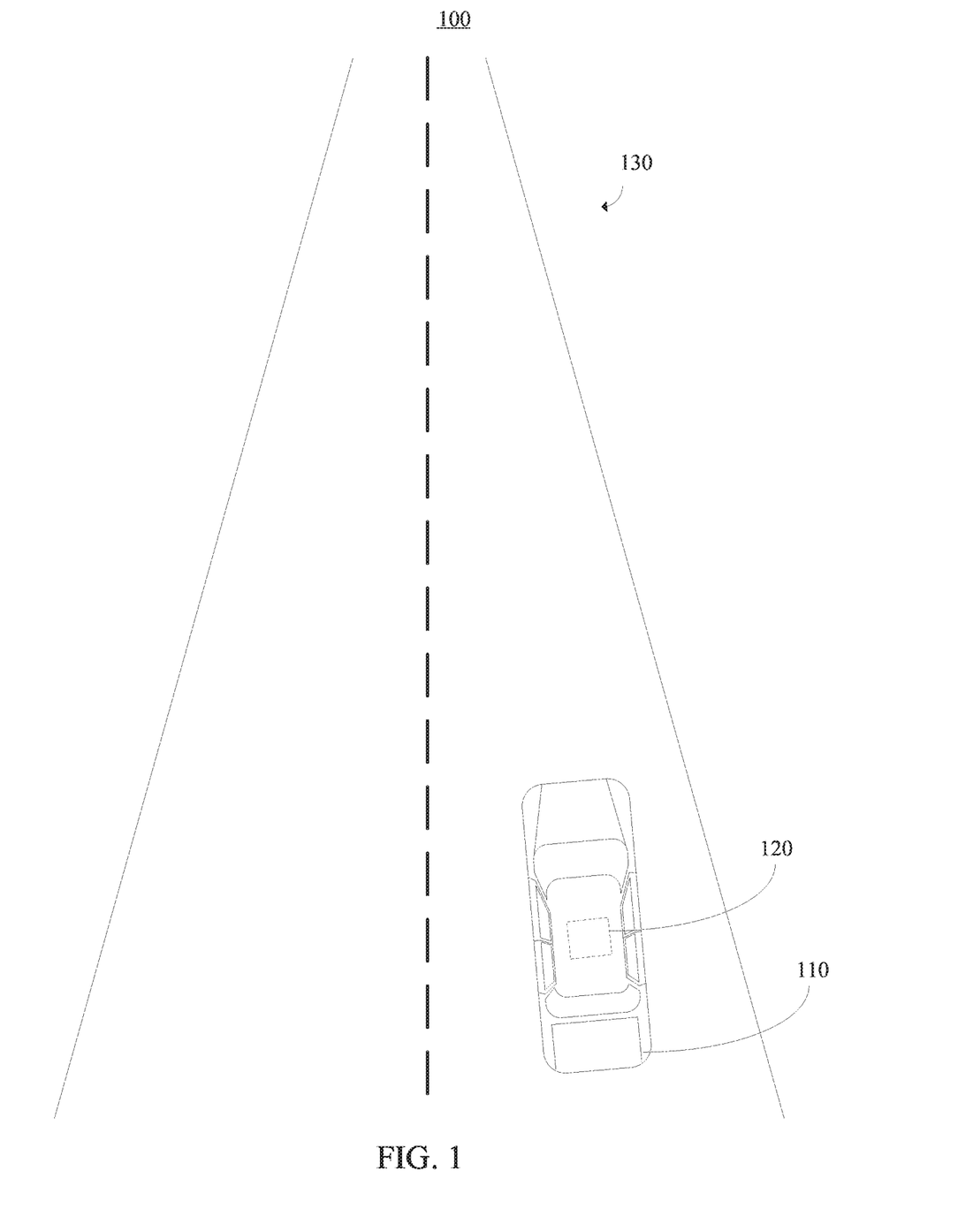
FIG. 1 is a diagram illustrating an exemplary environment implementing a machine learning (ML) model, in accordance with an embodiment of the present invention.

Referring now in detail to the figures in which like numerals represent the same or similar elements and initially to FIG. 1, a block/flow diagram is provided illustrating a block/flow diagram of a high-level overview of an exemplary system 100 implementing a machine learning (ML) model and/or artificial intelligence (AI)-powered service. More specifically, the system 100 implements autonomous vehicle driving.

As shown, the system 100 includes a vehicle 110. In this illustrative embodiment, the vehicle 110 is depicted as a car. However, the vehicle 110 can be any suitable vehicle in accordance with the embodiments described herein.

As further shown, an image capturing device 120 can be positioned on the vehicle 110. In one embodiment, the image capturing device 120 includes a camera (e.g., monocular camera setup). As shown in this illustrative embodiment, the image capturing device 120 is mounted on the roof of the vehicle 110. However, the image capturing device 120 can be positioned in any suitable location on or inside of the vehicle 110, in accordance with the embodiments described herein.

The image capturing device 120 is configured to obtain still images and/or a video sequence associated with a perspective view of a scene 130. For example, the image capturing device 120 can be configured to capture red-green-blue (RGB) images of the scene. Additionally, although the scene 130 in FIG. 1 shows an empty road, the scene 130 can be any suitable driving scene in accordance with the embodiments described herein. Examples of such driving scenes can include, but are not limited to, highways, urban areas with complex intersections, etc. Moreover, foreground scene objects or elements of the scene 130 can include, but are not limited to, other cars, pedestrians, traffic signs, poles, etc.

The system 100 can use a ML model to implement autonomous driving of the vehicle 100. As will be described in further detail below, the confidentiality of the ML model used to drive the vehicle 110 can be protected with program compartmentalization. Although the illustrative embodiment of FIG. 1 is described within the context of an autonomously driving vehicle, the embodiments described herein can be applied to any system capable of implementing ML models and/or AI-powered services. Examples of other system capable of implementing ML models and/or AI-powered services include, but are not limited to, object recognition, natural language generation, speech recognition, and robotic process automation.

Figure 2:
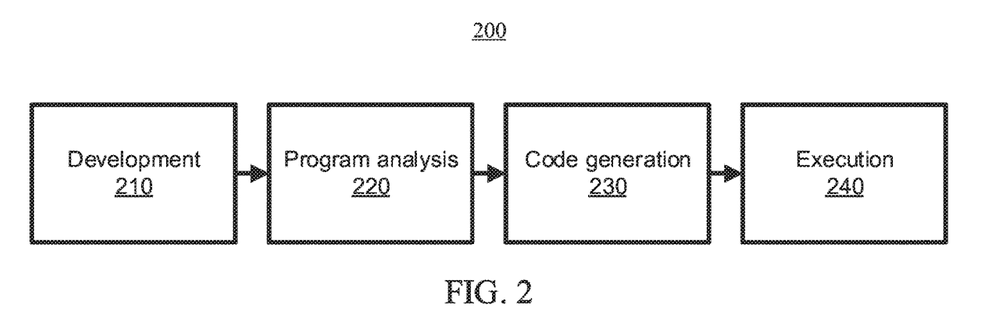
FIG. 2 is a block/flow diagram of a high-level overview of system/method for implementing confidential ML with program compartmentalization, in accordance with an embodiment of the present invention.

With reference to FIG. 2, a block/flow diagram is provided illustrating a high-level overview of an exemplary system/method 200 for implementing confidential machine learning (ML) with program compartmentalization.

The system/method 200 can include a plurality of components, including a development component 210, a program analysis component 220, a code generation component 230, and an execution component 240. One or more of the components 210 through 240 can include functionality for automatically generating an ML model with confidentiality protection.

The development component 210 is configured to implement a development stage that designs the ML program for generating a ML model. During the development stage, the source code of the ML program can be annotated to generate an ML program annotation that indicates which part needs confidentiality protection. Annotation keywords for confidential code can be implemented using a preprocessor (e.g., #pragma confidential" for C/C++) and are prepended to any confidential source code statement. In some ML programs, the confidential source code statements are those that determine the ML architecture such as, e.g., a sequence of function calls to the ML library and hyperparameters. The annotation informs the compiler which statements need confidentiality protection, and can be used as an input by the program analysis component 220 during the program analysis step of the compilation.

The program analysis component 220 is configured to perform program analysis based on the output of the development component 210. More specifically, the program analysis component 220 can compile the source code of the ML program based on the ML program annotation to generate the ML model. The ML model can be generated in a binary format, and can be executed for training or deployment on one or more computing devices associated with one or more end-users. Further details regarding the program analysis component 220 are described below with reference to FIG. 3.

Figure 3:
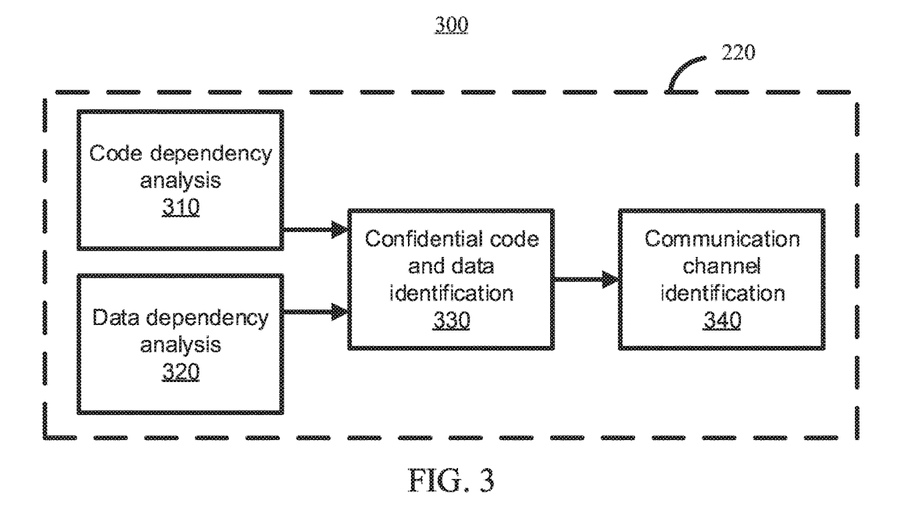
FIG. 3 is a block/flow diagram of a system/method for implementing a log program analysis component within the system/method of FIG. 2, in accordance with an embodiment the present invention.

With reference to FIG. 3, a block/flow diagram is provided illustrating a system/method 300 for performing program analysis. As shown, a program analysis component 220 can include a plurality of subcomponents, including a code dependency analysis subcomponent 310, a data dependency analysis subcomponent 320, a confidential code and data identification subcomponent 330, and a communication channel identification subcomponent 340.

The subcomponents 310 and 320 are configured to receive an ML program annotation to perform lexical and syntax analyses on the code and the data, respectively.

More specifically, the subcomponent 310 can construct a control dependency graph based on the source code. In the control dependency graph, a node represents a program statement, and an edge (e.g., directed edge) represents a control dependency between two connected nodes. Node A is control-dependent on Node B if the program must execute Node B in order to execute Node A.

The subcomponent 320 can construct a data dependency graph based on the source code. In the data dependency graph, a node represents a program statement or a data object, and an edge (e.g., directed edge) represents a data dependency between two connected nodes. Node A is data-dependent on Node B if the execution of Node B can affect the value of data accessed by A. For example, Node B alters the value of the data before Node A. As another example, Node A can be control-dependent on Node B and thus the execution of Node B determines whether Node A will be executed to access the data.

The subcomponent 330 is configured to identify confidential code and data based on the control and data dependency graphs. The confidential code and data can include the minimal code and data for loading onto the enclave for confidential ML model execution.

More specifically, by following the edges of the control and data dependency graphs construed by the subcomponents 310 and 320, the subcomponent 330 can identify the set of program statements on which the annotated confidential statements have dependencies. The annotated confidential program statements and other statements on which they are dependent can be identified as the confidential part of the program, while all other program statements can be identified as the non-confidential part of the program.

Since it may be possible for an attacker to infer the confidential parts of the ML model based only on the non-confidential parts that have a dependency on the confidential parts, the subcomponent 330 can identify the dependent code and data on the confidential parts and load them into the enclave as well.

For example, model parameters (which can be determined during training) have a dependency on the ML program and hyperparameters, and their confidentiality should be protected to avoid theft or reverse engineering. By analyzing the control and data paths starting from the annotated statements of the ML program annotation, the code and data dependency analyses can identify the program parts that must be loaded into the enclave for the confidentiality protection.

The subcomponent 340 is configured to identify communication channels between the confidential and non-confidential parts (e.g., across the enclave) and determine one or more of the communication channels that need to be protected for confidentiality. The communication channels can include control and data paths across the enclave boundary. The communication channels can be identified using the control and data dependency graphs constructed by the subcomponents 310 and 320. More specifically, the edges that connect two nodes in the confidential and non-confidential parts across the boundary represent the communication channels. These edges can include system calls from inside the confidential part.

Referring back to FIG. 2, a code generation component 230 is configured to implement a compilation stage that generates the binary code based on the result of program analysis from the component 220. Further details regarding the component 230 are described below with reference to FIG. 4.

Figure 4:
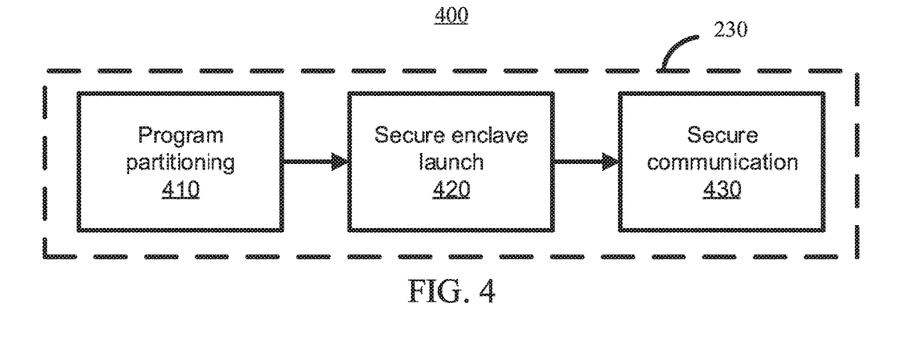
FIG. 4 is a block/flow diagram of a system/method for implementing a code generation component within the system/method of FIG. 2, in accordance with an embodiment the present invention.

With reference to FIG. 4, a block/flow diagram is provided illustrating a system/method 400 for performing code generation. As shown, a program analysis component 220 can include a plurality of subcomponents, including a program partitioning subcomponent 410, a secure enclave launch subcomponent 420, and a secure communication subcomponent 440.

The subcomponent 410 is configured to partition the ML program into a confidential part and a non-confidential part based on an analysis of the ML program (e.g., based on an output of the program analysis component 220 of FIG. 2).

The program statements in the "confidential" and "non-confidential" parts can be annotated separately in the abstract syntax tree (AST) during the compilation. This can be also done in the same fashion when the source code is converted into an intermediate representation (e.g., LLVM, GIMPLE, and Java® bytecode). The program statements that serve as the communication channels between the confidential and non-confidential parts are also annotated as "channel" in the AST.

The subcomponent 420 is configured to insert run-time code into the confidential and non-confidential parts for securely launching the enclave with the confidential part in isolation from the non-confidential part.

More specifically, at the beginning of the non-confidential part (e.g., before the first node in the AST with the "non-confidential" annotation), the subcomponent 420 can insert new program statements to call a function to create an enclave that will encapsulate the confidential part of the program after key and integrity verification. For example, the function "sgx_create_enclave" can be called in relation to the Intel® SGX software development kit (SDK). At the end of the non-confidential part (e.g., after the last node in the AST with the "non-confidential" annotation), the subcomponent 420 can insert new program statements to call a function that will destroy the enclave with the confidential part after the execution finishes. For example, the function "sgx_destroy_enclave" can be called in relation to the Intel® SGX SDK.

The subcomponent 430 is configured to insert additional run-time code into the communication channels across the enclave boundary (e.g., control and data paths) to enable secure communication. Accordingly, the generated binary code executes the ML model with increased efficiency as the size of the enclave is kept minimal.

For example, in both the confidential and non-confidential parts, each program statement that serves as the communication channel (e.g., each node in the AST with the "channel" annotation) can be instrumented with additional statements to convert it into an enclave call (ECALL) that enters the enclave, or an outside call (OCALL) that calls an untrusted function from the enclave (e.g., using functions in the Intel® SGX SDK). More specifically, the program can enter the enclave with an ECALL and temporarily exit the enclave with an OCALL. The channel statements inside the non-confidential part are instrumented to become ECALLs and those inside the confidential part are instrumented to become OCALLs.

These instrumented channel statements can be used to safely switch the control of the program between the enclave and non-enclave parts during the run-time. Since the channel statements outside of the enclave do not have data dependency on the counter statements in the enclave (only control dependency), these channel statements do not reveal any information of the confidential code and data inside the enclave.

Referring back to FIG. 2, the execution component 240 is configured to execute the ML program with the inserted code to generate the ML model. During execution, the confidentiality of the ML model and the ML program is protected from attack.

Figure 5:
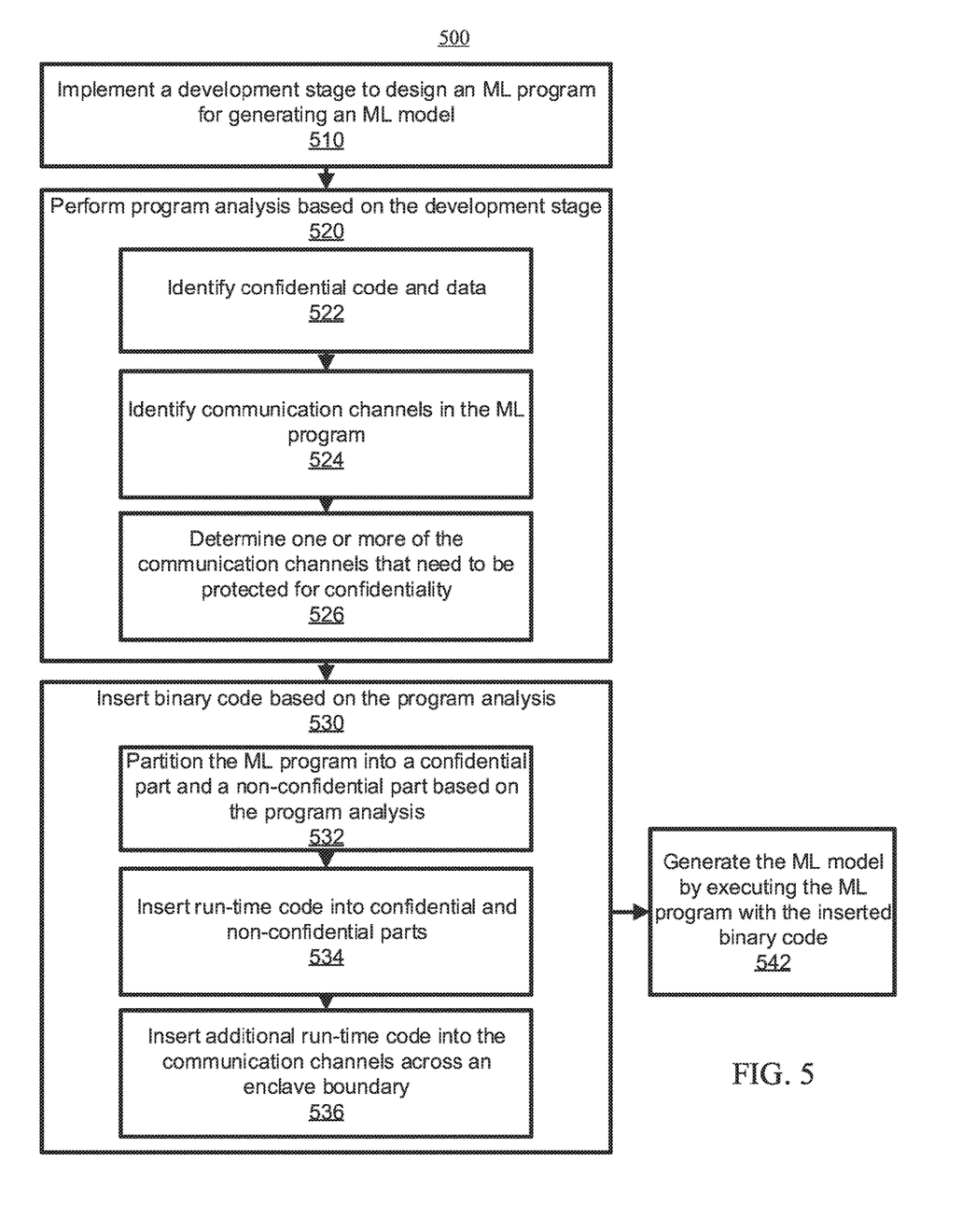
FIG. 5 is a block/flow diagram of a system/method for implementing confidential ML with program compartmentalization, in accordance with an embodiment of the present invention.

With reference to FIG. 5, a block/flow diagram is provided illustrating a system/method 500 for implementing confidential machine learning (ML) with program compartmentalization.

At block 510, a development stage is implemented to design an ML program for generating an ML model. Implementing the development stage to design the ML program can include annotating the source code of the ML program to generate an ML program annotation that indicates which part needs confidentiality protection. Annotation keywords for confidential code can be implemented using a preprocessor (e.g., #pragma confidential" for C/C++) and are prepended to any confidential source code statement. In some ML programs, the confidential source code statements are those that determine the ML architecture such as, e.g., a sequence of function calls to the ML library and hyperparameters. The annotation informs the compiler which statements need confidentiality protection, and can be used as an input during a program analysis step of the compilation.

At block 520, program analysis is performed based the development stage. Performing the program analysis can include compiling the source code of the ML program based on the ML program annotation to generate the ML model. The ML model can be generated in a binary format, and can be executed for training or deployment on one or more computing devices associated with one or more end-users.

In one embodiment, performing the program analysis can include, at block 522, identifying confidential code and data, at block 524, identifying communication channels in the ML program, and, at block 526, determining one or more of the communication channels that need to be protected for confidentiality. The communication channels can include control and data paths across the enclave boundary.

More specifically, identifying the confidential code and data at block 522 can include performing lexical and syntax analysis on code and data based on the ML program annotation to identify the minimal code and data for loading onto an enclave for confidential model execution. Since it may be possible for an attacker to infer the confidential parts of the ML model based only on the non-confidential parts that have a dependency on the confidential parts, in one embodiment, the dependent code and data on the confidential parts can be identified and further loaded into the enclave. For example, model parameters (which can be determined during training) have a dependency on the ML program and hyperparameters, and their confidentiality should be protected to avoid theft or reverse engineering. By analyzing the control and data paths starting from the annotated statements of the ML program annotation, the code and data dependency analyses can identify the program parts that must be loaded into the enclave for the confidentiality protection.

At block 530, binary code is inserted based on the program analysis. Inserting the binary code can include generating the binary code by analyzing syntax and semantics of the source code.

In one embodiment, inserting the binary code can include, at block 532, partitioning the ML program into a confidential part and a non-confidential part based on the program analysis, at block 534, inserting run-time code into the confidential and non-confidential parts and, at block 536, inserting additional run-time code into the communication channels across the enclave boundary. The run-time code can be inserted at block 534 for securely launching the enclave with the confidential part in isolation from the non-confidential part, and the additional run-time code can be inserted at block 536 to enable secure communication. The communication channels can include control and data paths.

At block 540, the ML model is generated by executing the ML program with the inserted binary code. During execution of the ML program, the confidentiality of the ML model and the ML program is protected from attack.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
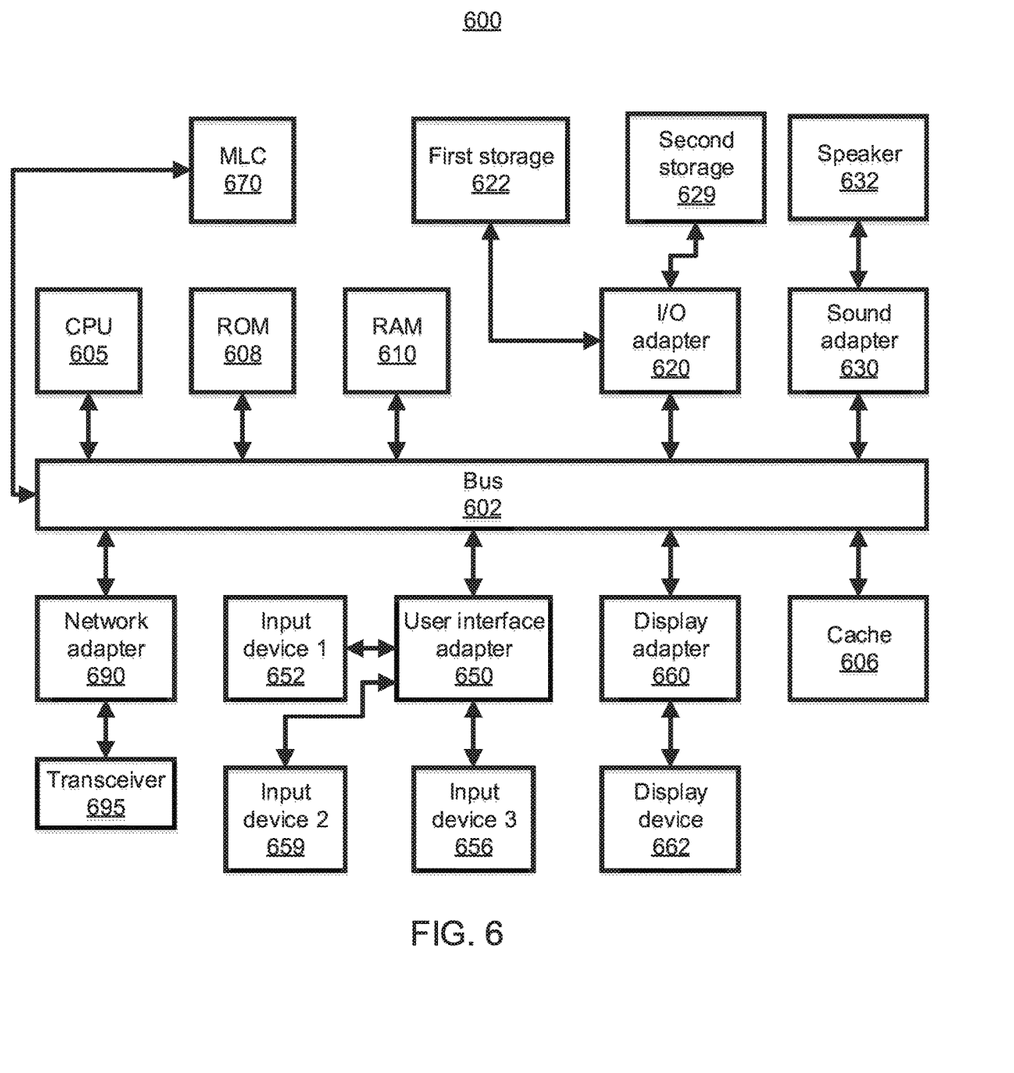
FIG. 6 is a block/flow diagram illustrating a computer system, in accordance with an embodiment the present invention.

Referring now to FIG. 6, an exemplary computer system 600 is shown which may represent a server or a network device, in accordance with an embodiment of the present invention. The computer system 600 includes at least one processor (CPU) 605 operatively coupled to other components via a system bus 602. A cache 606, a Read Only Memory (ROM) 608, a Random-Access Memory (RAM) 610, an input/output (I/O) adapter 620, a sound adapter 630, a network adapter 690, a user interface adapter 650, and a display adapter 660, are operatively coupled to the system bus 602.

A first storage device 622 and a second storage device 629 are operatively coupled to system bus 602 by the I/O adapter 620. The storage devices 622 and 629 can be any of a disk storage device (e.g., a magnetic or optical disk storage device), a solid state magnetic device, and so forth. The storage devices 622 and 629 can be the same type of storage device or different types of storage devices.

A speaker 632 may be operatively coupled to system bus 602 by the sound adapter 630. A transceiver 695 is operatively coupled to system bus 602 by network adapter 690. A display device 662 is operatively coupled to system bus 602 by display adapter 660.

A first user input device 652, a second user input device 659, and a third user input device 656 are operatively coupled to system bus 602 by user interface adapter 650. The user input devices 652, 659, and 656 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 652, 659, and 656 can be the same type of user input device or different types of user input devices. The user input devices 652, 659, and 656 are used to input and output information to and from system 600.

Machine learning confidentiality (MLC) component 670 may be operatively coupled to system bus 602. MLC component 670 is configured to perform one or more of the operations described above. MLC component 670 can be implemented as a standalone special purpose hardware device, or may be implemented as software stored on a storage device. In the embodiment in which MLC component 670 is software-implemented, although shown as a separate component of the computer system 600, MLC component 670 can be stored on, e.g., the first storage device 622 and/or the second storage device 629. Alternatively, MLC component 670 can be stored on a separate storage device (not shown).

Of course, the computer system 600 may also include other elements (not shown), as readily contemplated by one of skill in the art, as well as omit certain elements. For example, various other input devices and/or output devices can be included in computer system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 600 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for implementing confidential machine learning (ML) with program compartmentalization, comprising:
    implementing a development stage to design an ML program, including annotating source code of the ML program to generate an ML program annotation;
    performing program analysis based on the development stage, including compiling the source code of the ML program based on the ML program annotation, the program analysis further comprising identifying confidential code and data for loading on an enclave for confidential execution of the ML model by performing lexical and syntax analysis and by identifying a set of program statements upon which annotated confidential program statements are dependent as a confidential part of the program based on edges of a control and data dependency graph;
    inserting binary code based on the program analysis, including inserting run-time code into a confidential part of the ML program and a non-confidential part of the ML program; and
    generating an ML model by executing the ML program with the inserted binary code to protect the confidentiality of the ML model and the ML program from attack.

2. The method of claim 1, wherein the ML program annotation informs a compiler regarding which statements need confidentiality protection.

3. The method of claim 1, wherein the ML model is generated in a binary format for training or deployment on one or more computing devices.

4. The method of claim 1, wherein performing the program analysis further includes:
    identifying communication channels across a boundary of the enclave; and
    determining one or more of the communication channels that need confidentiality protection, wherein less than all of the communication channels are determined to need confidentiality protection.

5. The method of claim 4, wherein the communication channels include control and data paths.

6. The method of claim 4, wherein the run-time code securely launches the enclave with the confidential part in isolation from the non-confidential part, and wherein inserting the binary code further include inserting additional run-time code into the communication channels to enable secure communication.

7. The method of claim 4, further comprising partitioning the ML program into the confidential part and the non-confidential part.

8. A computer program product comprising a non-transitory computer readable storage medium having program instructions embodied therewith, the program instructions executable by a computer to cause the computer to perform a method for implementing confidential machine learning with program compartmentalization, the method performed by the computer comprising:
    implementing a development stage to design an ML program, including annotating source code of the ML program to generate an ML program annotation;
    performing program analysis based on the development stage, including compiling the source code of the ML program based on the ML program annotation, the program analysis further comprising identifying confidential code and data for loading on an enclave for confidential execution of the ML model by performing lexical and syntax analysis and by identifying a set of program statements upon which annotated confidential program statements are dependent as a confidential part of the program based on edges of a control and data dependency graph;
    inserting binary code based on the program analysis, including inserting run-time code into a confidential part of the ML program and a non-confidential part of the ML program; and
    generating an ML model by executing the ML program with the inserted binary code to protect the confidentiality of the ML model and the ML program from attack.

9. The computer program product of claim 8, wherein the ML program annotation informs a compiler regarding which statements need confidentiality protection.

10. The computer program product of claim 8, wherein the ML model is generated in a binary format for training or deployment on one or more computing devices.

11. The computer program product of claim 8, wherein performing the program analysis further includes:
   identifying communication channels across a boundary of the enclave; and
   determining one or more of the communication channels that need confidentiality protection, wherein less than all of the communication channels are determined to need confidentiality protection.

12. The computer program product of claim 11, wherein the communication channels include control and data paths.

13. The computer program product of claim 11, wherein the run-time code securely launches the enclave with the confidential part in isolation from the non-confidential part, and wherein inserting the binary code further include inserting additional run-time code into the communication channels to enable secure communication.

14. The computer program product of claim 11, wherein the method further includes partitioning the ML program into the confidential part and the non-confidential part.

15. A system for implementing confidential machine learning with program compartmentalization, comprising:
   a memory device having program code stored thereon; and
   at least one processor device operatively coupled to the memory device and configured to execute program code stored on the memory device to:
     implement a development stage to design an ML program by annotating source code of the ML program to generate an ML program annotation;
     perform program analysis based on the development stage by compiling the source code of the ML program based on the ML program annotation, the program analysis further comprising identifying confidential code and data for loading on an enclave for confidential execution of the ML model by performing lexical and syntax analysis and by identifying a set of program statements upon which annotated confidential program statements are dependent as a confidential part of the program based on edges of a control and data dependency graph;
     insert binary code based on the program analysis by inserting run-time code into a confidential part of the ML program and a non-confidential part of the ML program; and
     generate an ML model by executing the ML program with the inserted binary code to protect the confidentiality of the ML model and the ML program from attack.

16. The system of claim 15, wherein the ML program annotation informs a compiler regarding which statements need confidentiality protection.

17. The system of claim 15, wherein the ML model is generated in a binary format for training or deployment on one or more computing devices.

18. The system of claim 15, wherein the at least one processor device is further configured to perform the program analysis by:
   identifying communication channels across a boundary of the enclave; and
   determining one or more of the communication channels that need confidentiality protection, wherein less than all of the communication channels are determined to need confidentiality protection.

19. The system of claim 18, wherein the communication channels include control and data paths.

20. The system of claim 18, wherein:
   the at least one processor device is further configured to execute program code stored on the memory device to partition the ML program into the confidential part and the non-confidential part;
   the run-time code securely launches the enclave with the confidential part in isolation from the non-confidential part; and
   the at least one processor device is further configured to insert the binary code by inserting additional run-time code into the communication channels to enable secure communication.

* * * * *